United States Patent
Berg

(10) Patent No.: US 6,375,400 B1
(45) Date of Patent: Apr. 23, 2002

(54) CARGO SUPPORT

(75) Inventor: Sture Berg, deceased, late of Vara (SE), by Lena Berg, executrix

(73) Assignee: Safe Load International AB, Vara (SE)

( * ) Notice: Subject to any disclaimer, the term of this patent is extended or adjusted under 35 U.S.C. 154(b) by 0 days.

(21) Appl. No.: 09/674,089

(22) PCT Filed: Apr. 13, 1999

(86) PCT No.: PCT/SE99/00589

§ 371 Date: Jan. 24, 2001

§ 102(e) Date: Jan. 24, 2001

(87) PCT Pub. No.: WO99/61277

PCT Pub. Date: Dec. 2, 1999

(30) Foreign Application Priority Data

May 14, 1998 (SE) ............................................. 9801733

(51) Int. Cl.⁷ .................................................. B60P 7/15
(52) U.S. Cl. ........................ 410/151; 410/124; 410/143
(58) Field of Search .............................. 410/124, 151, 410/143, 145, 149; 211/105.3; 248/354.6; 267/118, 124

(56) References Cited

U.S. PATENT DOCUMENTS

| | | | |
|---|---|---|---|
| 2,993,708 A | | 7/1961 | Holman, Jr. |
| 3,699,898 A | | 10/1972 | Nolan |
| 4,023,819 A | * | 5/1977 | Holman, Jr. ................. 410/151 |
| 4,332,515 A | * | 6/1982 | Twyman ...................... 410/149 |
| 4,343,578 A | * | 8/1982 | Barnes ......................... 410/151 |
| 4,834,599 A | * | 5/1989 | Gordon et al. .............. 410/151 |
| 5,018,918 A | * | 5/1991 | Jacobs et al. ................ 410/145 |
| 5,028,185 A | | 7/1991 | Shannon ...................... 410/151 |
| 5,192,187 A | | 3/1993 | Sweet .......................... 410/151 |
| 5,281,063 A | * | 1/1994 | Austin, III ................... 410/151 |
| 5,769,580 A | * | 6/1998 | Purvis ......................... 410/151 |
| 5,947,666 A | * | 9/1999 | Huang ......................... 410/151 |

FOREIGN PATENT DOCUMENTS

SE 463810 12/1990

* cited by examiner

Primary Examiner—Stephen T. Gordon

(57) ABSTRACT

A cargo support includes a pair of sections telescopically displaceable relative to one another. An actuator is mounted on said sections for producing a relative movement of said sections. A locking member is provided for locking the sections in predetermined positions. The actuator includes a gas spring. The locking member includes a shut-off valve connected with the gas spring, wherein when the locking member is in a closed position, the gas spring is locked in a predetermined position and when the locking member is in an open position, the gas spring is permitted to expand and contract.

7 Claims, 3 Drawing Sheets

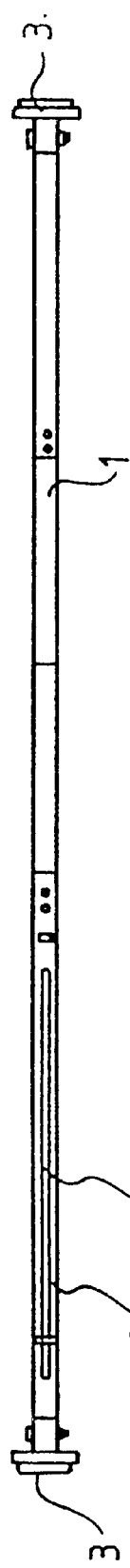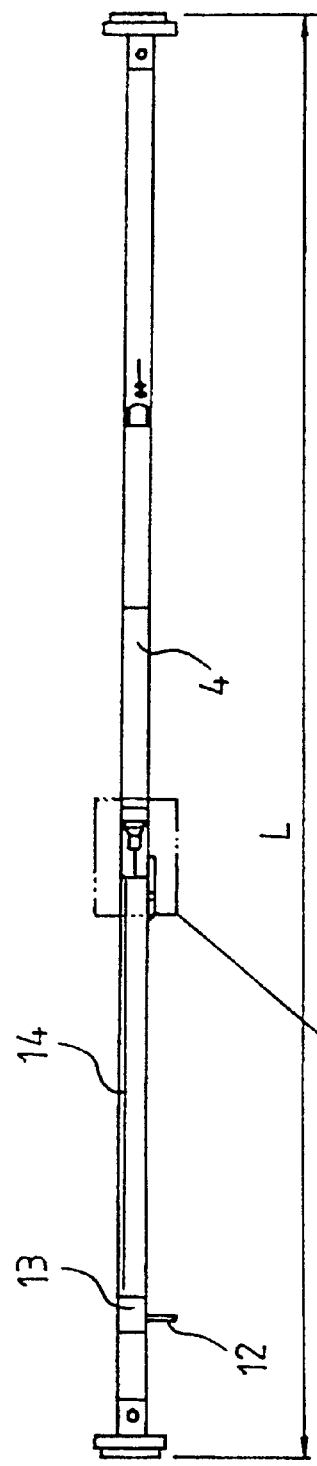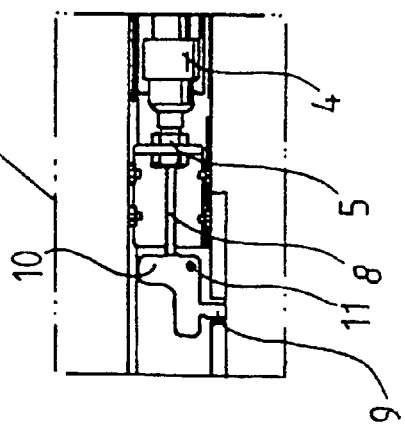

CARGO SUPPORT

This application is the national phase under 35 U.S.C. § 371 of PCT International Application No. PCT/SE99/00589 which has an International filing date of Apr. 13, 1999, which designated the United States of America.

TECHNICAL FIELD

The present invention relates to a cargo support comprising a pair of sections, which are telescopically displaceable relative to one another, an actuator is mounted on said sections in order to produce a relative movement of the sections, and a locking means is provided for locking the sections in the desired relative position.

BACKGROUND

Cargo supports of the kind defined above are used to anchor and separate cargo on vehicle loading platforms, in the holds or cargo spaces of ships, and so on. The supports are secured between facing walls or between the ceiling and floor in the cargo space. One example of a cargo support of this kind is disclosed e.g. in SE 463 810.

The problem experienced with the solution suggested in this publication is that the resulting device is comparatively bulky and complex, in addition to which it is relatively inconvenient to place in position and requires considerable force and the use of both hands of the operator.

Prior-art constructions, having pivotal levers and the Like, are also hazardous to the user due to the considerable risks of clamping injuries. In addition, the mechanisms of these constructions are often un-protected and exposed towards the user, thus increasing the risk of damages to the mechanism when the cargo support is subjected to impacts or other violence.

In addition, several prior-art constructions forced the user to operate in an uncomfortable position when applying or removing the support.

OBJECT OF THE INVENTION

It is consequently an object of the present invention to provide a cargo support of the kind defined above, which is more convenient to handle than those of prior-art structure.

This object is achieved by means of a cargo support according to the present invention.

BRIEF DESCRIPTION OF THE DRAWING FIGURES

The invention will be described in more detail in the following by means of one embodiment and with reference to the accompanying drawings, wherein FIG. 1 is a front view of the cargo support in accordance with one embodiment of the invention, the support being shown in its retracted position;

FIG. 2 is a lateral view of the cargo support of FIG. 1, the support being shown partly in cross-section;

DESCRIPTION OF THE PREFERRED EMBODIMENTS

Figure 3:
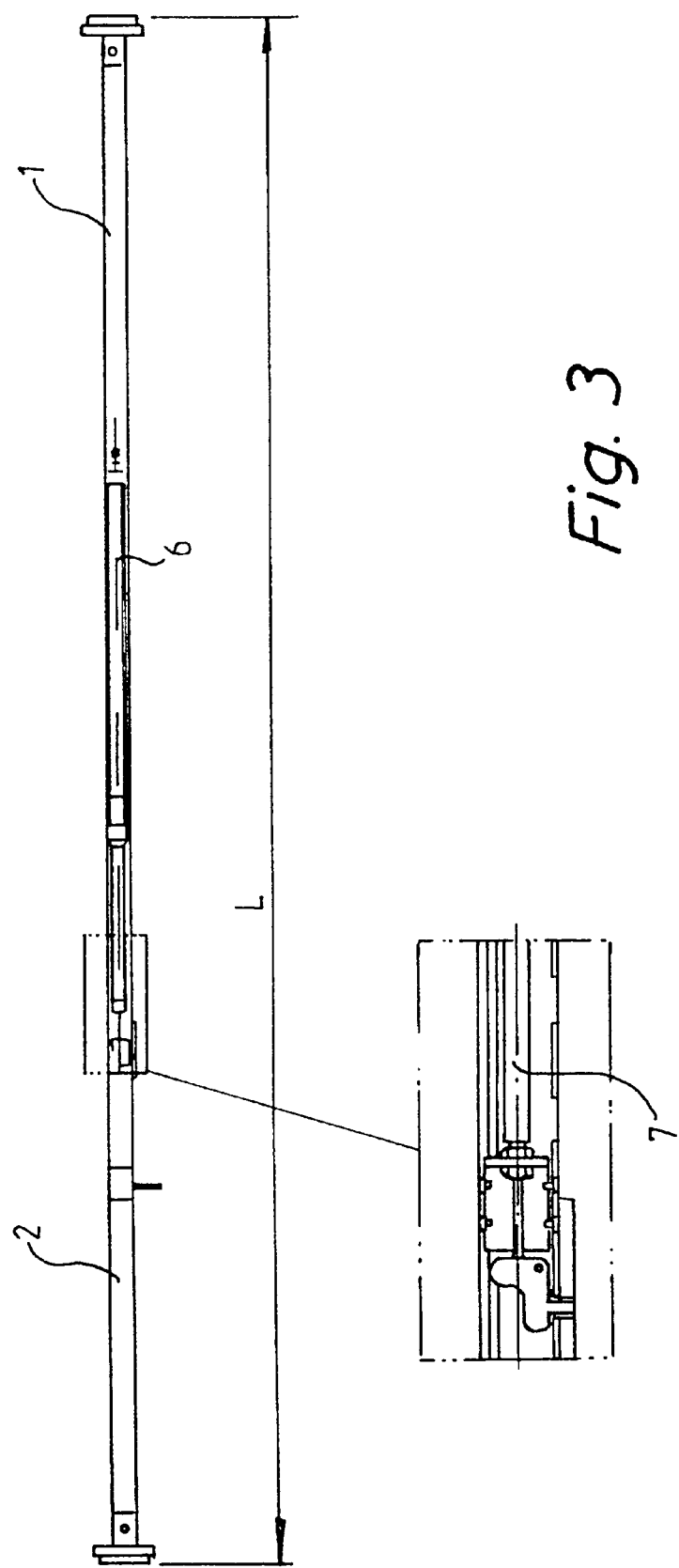
FIG. 3 is a view of the cargo support of FIG. 2, the support being shown in its extended position.
Figure 4:
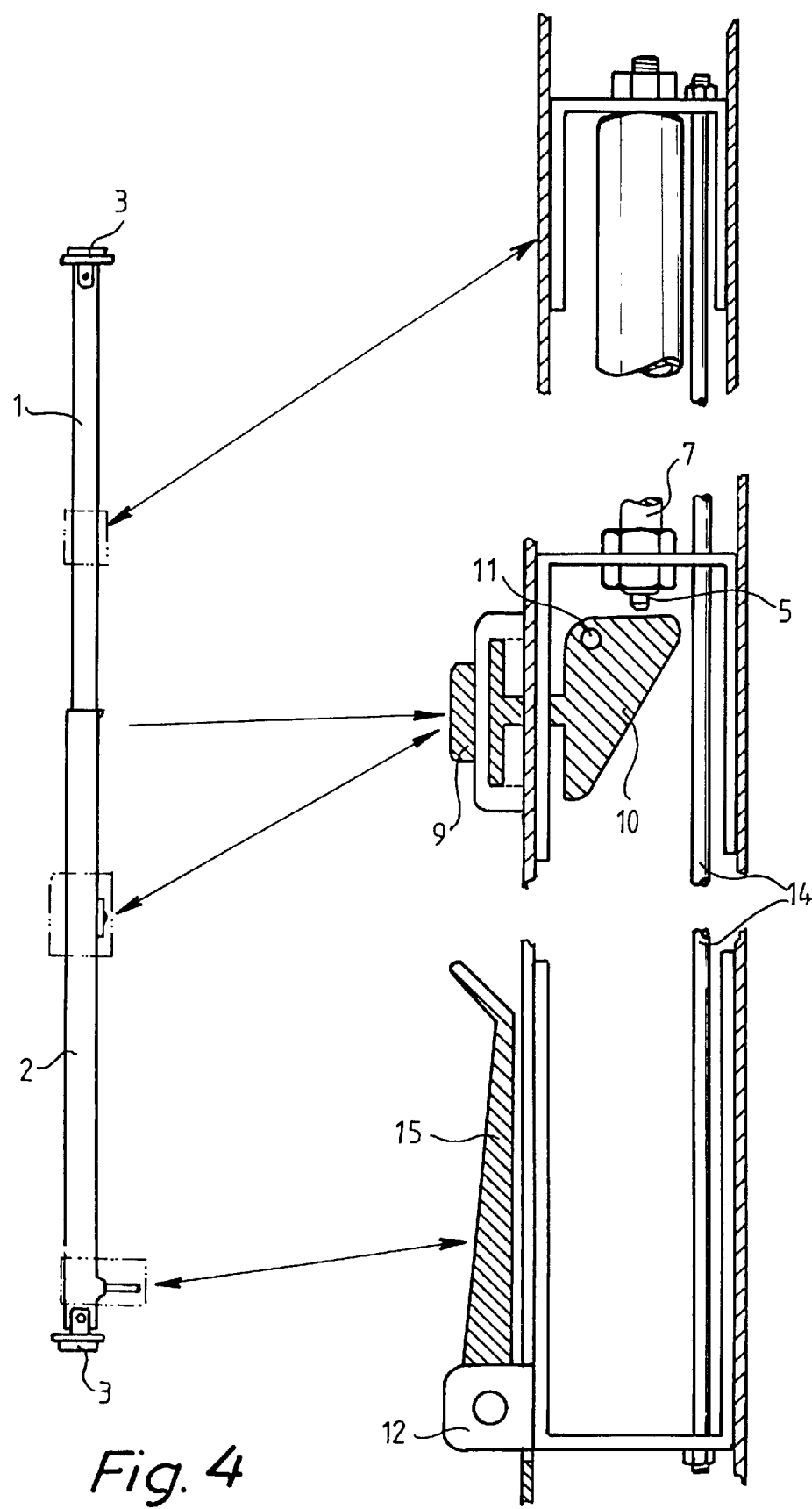
FIG. 4 is a view of the cargo support of FIG. 1, certain parts being however, shown on a larger scale and in cross-section.

One embodiment of a cargo support in accordance with the present invention illustrated in the drawing figures comprises two sections 1, 2, which are arranged to be telescopically displaceable relative to one another. The ends suitably support pads 3, preferably of rubber or some other at least somewhat elastically resilient material providing satisfactory friction against walls, floors or ceilings in the cargo space.

Furthermore, the cargo support comprises an actuator 4 arranged to cause a relative movement between the displaceable support sections 1, 2 and preferably located in the interior thereof. In accordance with the invention, the actuator is a gas spring, which preferably comprises a gas-operated piston 6 and a gas chamber. A partition wall (not shown) divides the chamber into two parts, said wall being united with the piston rod 7 and arranged for movement inside the chamber. In this manner the mutual sizes of the chamber parts may be altered while at the same time the total chamber volume is kept constant. Furthermore, one of the chamber parts is formed with an opening, which may be opened or closed according to choice by means of a valve 5. By arranging an excess pressure in the other chamber part the operator is then able to control, by means of the valve 5, the amount of air to be evacuated from (or allowed into) one of the chamber Dares and thus to control the amount of displacement of the piston rod 7 relative to the piston 6. The valve 5 then acts as a locking means which, when open, allows retraction, i.e. contraction, as well as extension, viz. expansion, of the gas-actuated piston but which, in the closed position, locks the piston in its present position.

Although the type of gas piston of the type described above is the preferred one in the present embodiment, several other types of gas springs exist that provide similar functions and that obviously could be used in the place of the one described above.

Preferably, the valve 5 is an automatically closing valve, which opens when a valve pin 8 is depressed. This valve pin preferably is activated via an operating means 9 provided on the external face of the cargo support for the purpose of convenient handling thereof. Preferably, the operating means 9 is also displaceable transversely relative to the lengthwise extension of the support. In order to achieve this, a force transmitting member 10 may be provided intermediate the operating means 9 and the valve pin 8. This force transmitting member could be a component arranged to pivot about a shaft 11, as in the case of the embodiment shown in the drawings.

The cargo support in accordance with the invention further comprises means for retraction of the displaceable sections from the expanded position. Preferably, these means comprise a sliding groove 16 formed in one of the displacement sections and a shaft spindle 12, which is joined to the other displaceable section and received in said groove for sliding movement therein. The shaft spindle may be actuated manually in order to compress the gas spring, when the valve is opened, thus to cause the telescopic sections to slide into one another. Preferably, the shaft spindle is mounted on a sliding piece 13 located in the interior of one of the displaceable sections. In accordance with this embodiment, this sliding piece is connected to the other telescopically displaceable section via a rod 14.

In addition, the shaft spindle may be provided with a downwards foldable handle 15, which in its lower position offers the operator an improved grip thereon, for instance when the operator uses his foot to depress the shaft spindle, but which in its upwards-folded position only projects slightly away from the cargo support. Obviously, other varieties of means to contract the telescopically displaceable sections are possible. As an example may be mentioned different varieties of gearing mechanisms designed to reduce the force required for the displacement.

In accordance with one preferred embodiment a gas-actuated piston is used, the stroke of which amounts to at least 10 cm, preferably to 30 cm, and which exerts a force of at least 50 kg and preferably about 75 kg.

When in use, the cargo support initially assumes its compressed, contracted position illustrated in FIG. 2. The cargo support is placed in the desired position in the cargo space, whereupon the operating means 9 is depressed. When the operating means is depressed, which may be effected by means of one hand only, the valve 5 is opened via the force transmitting means 10. As a result, the gas-actuated piston expands, because the excess pressure in one of the chamber parts urges the partition wall in the direction towards the other part, thus forcing air out of this other chamber part through the valve. Upon expansion of the gas-actuated piston, i.e. when the piston rod 7 is pushed out of the piston 6, the telescopically displaceable sections 1, 2 are forced to move away from one another, whereby the cargo support is secured between walls on either end thereof. As the displaceable sections 1, 2 are displaced, also the shaft spindle 12 is displaced inside the sliding groove 16. The operating means is then released, causing the valve to close, whereby the cargo support is locked in its tightened position.

When the cargo support is to be removed, the operating means 9 is again depressed, whereupon the shaft spindle 12 manually by the operator, is pushed rearwardly along the sliding groove 16. Preferably, the cargo support is arranged in such a manner that the shaft spindle is to be forced downwards, allowing the operator to use his feet to assist in the depressing movement. When the shaft spindle is displaced, the displaceable sections, and consequently also the gas piston, are again contracted. This contraction causes the partition wall of the gas-actuated piston to move towards the closed chamber part, increasing the pressure inside this part while at the same time fresh air is sucked into the other chamber part. Following contraction of the cargo support, the operating means 9 is released, causing the valve to close and the gas-actuated piston to be locked in the contracted, tightened position.

The telescopically displaceable sections 1, 2 could of course be manufactured to various lengths, and in addition the gas-actuated piston could be located at different levels therein. In this manner, it becomes possible to adjust the cargo supports to cargo spaces of different dimensions. Possibly, the length of one or both displaceable sections could be adjustable.

The invention provides a cargo support, which is easy to apply in the position, also with one hand only, while simultaneously allowing the user to assume a comfortable working position. In addition, clamping-injury hazards are minimized, since the operating means is built into the structure. This feature likewise reduces the risks that the mechanism be damaged when exposed to impacts, blows or other violence.

The invention has been described above with reference to one embodiment. However, numerous varieties are possible. For instance, other gas-operated piston constructions than the one suggested herein may be used, provided they have an essentially identical function. Furthermore, other types of retraction means are conceivable, and some type of gearing mechanism may for instance be provided to reduce the force that the user has to apply to operate the means. These and other obvious solutions must be regarded as embraced by the scope of protection of the invention as the latter is defined in the appended claims.

What is claimed is:

1. A cargo support comprising:
   a pair of sections telescopically displaceable relative to one another;
   an actuator mounted on said sections for producing a relative movement of said sections; and
   a locking means for locking the sections in predetermined positions;
   said actuator includes a gas spring;
   said locking means includes a shut-off valve connected with the gas spring, wherein when said locking means is in a closed position, the gas spring is locked in a predetermined position and when the locking means is in an open position, the gas spring is permitted to expand and contract.

2. The cargo support according to claim 1, wherein said gas spring includes a chamber, a piston mounted within said chamber, a partition wall for dividing said chamber into a first part and a second part, and a piston rod operatively mounted to said partition wall, said locking means includes a valve being operatively connected to said gas spring to open or close to allow or prevent, respectively, a fluid flow into the first part of the chamber or the second part.

3. The cargo support according to claim 2, wherein a length of a stroke of the piston is in the range of approximately 10 cm to approximately 30 cm.

4. The cargo support according to claim 2, wherein when the valve is opened, the piston exerts a force of approximately 50 kg to approximately 75 kg.

5. The cargo support according to claim 1, wherein one of the sections telescopically displaceable relative to the other includes a sliding groove and the other section includes a shaft spindle received within said groove for movement therein, said shaft spindle being arranged to be actuated manually for compressing the gas spring when the locking means is open for causing sliding movement of the telescopically displaceable section one within the other.

6. The cargo support according to claim 1, and further including a force transmitting system for operating the locking means, an operating means displaceable transversely relative to a longitudinal direction of the cargo support for opening said locking means.

7. The cargo support according to claim 1, and further including resilient pads mounted on at least one end of the sections.

* * * * *